United States Patent
Simpson

(10) Patent No.: US 12,080,092 B2
(45) Date of Patent: Sep. 3, 2024

(54) PERSISTENT FEATURE BASED IMAGE ROTATION AND CANDIDATE REGION OF INTEREST

(71) Applicant: United States Postal Service, Washington, DC (US)

(72) Inventor: Ryan J. Simpson, Vienna, VA (US)

(73) Assignee: United States Postal Service, Washington, DC (US)

(*) Notice: Subject to any disclaimer, the term of this patent is extended or adjusted under 35 U.S.C. 154(b) by 8 days.

(21) Appl. No.: 17/664,837

(22) Filed: May 24, 2022

(65) Prior Publication Data
US 2022/0292802 A1 Sep. 15, 2022

Related U.S. Application Data

(63) Continuation of application No. 16/040,344, filed on Jul. 19, 2018, now Pat. No. 11,373,388.
(Continued)

(51) Int. Cl.
*B07C 3/00* (2006.01)
*B07C 3/20* (2006.01)
(Continued)

(52) U.S. Cl.
CPC ............ *G06V 30/424* (2022.01); *B07C 3/006* (2013.01); *B07C 3/20* (2013.01); *G06K 7/1404* (2013.01);
(Continued)

(58) Field of Classification Search
CPC ...... G06V 30/10; G06V 30/40; G06V 30/224; G06V 30/153; G06V 30/2253;
(Continued)

(56) References Cited

U.S. PATENT DOCUMENTS 6,285,802 B1   9/2001   Dennis et al.
6,360,001 B1   3/2002   Berger et al.
(Continued)

FOREIGN PATENT DOCUMENTS

JP   2000-048120 A   2/2000

OTHER PUBLICATIONS

Ciardiello et al., "An Experimental System for Office Document Handling and Text Recognition", Nov. 14-17, 1988, 9th International Conference on Pattern Recognition, vol. II, 7 pages.
(Continued)

*Primary Examiner* — Matthew C Bella
*Assistant Examiner* — Dennis Rosario
(74) *Attorney, Agent, or Firm* — Knobbe Martens Olson & Bear LLP

(57) ABSTRACT

Embodiments of a system and method for sorting and delivering articles in a processing facility based on image data are described. Image processing results such as rotation notation information may be included in or with an image to facilitate downstream processing such as when the routing information cannot be extracted from the image using an unattended system and the image is passed to an attended image processing system. The rotation notation information may be used to dynamically adjust the image before presenting the image via the attended image processing system.

14 Claims, 11 Drawing Sheets

Related U.S. Application Data

(60) Provisional application No. 62/536,309, filed on Jul. 24, 2017.

(51) Int. Cl.

| | | |
|---|---|---|
| *G06K 7/14* | (2006.01) | |
| *G06V 10/24* | (2022.01) | |
| *G06V 30/146* | (2022.01) | |
| *G06V 30/40* | (2022.01) | |
| *G06V 30/413* | (2022.01) | |
| *G06V 30/424* | (2022.01) | |
| *H04N 1/00* | (2006.01) | |
| *G07B 17/00* | (2006.01) | |

(52) U.S. Cl.
CPC ........ *G06V 10/242* (2022.01); *G06V 30/1478* (2022.01); *G06V 30/40* (2022.01); *G06V 30/413* (2022.01); *H04N 1/00331* (2013.01); *H04N 1/0036* (2013.01); *B07C 2301/0066* (2013.01); *B07C 2301/0075* (2013.01); *B65G 2811/0673* (2013.01); *B65G 2811/0678* (2013.01); *G07B 2017/00725* (2013.01)

(58) Field of Classification Search
CPC .... G06V 20/625; G06V 20/63; G06V 20/635; G06V 30/1475; G06V 30/287; G06V 30/293; G06V 30/28; G06V 30/245; G06V 30/424; G06F 16/93; G06F 40/174; G06F 40/169; G06F 16/5846; G06F 16/9554; G06F 40/279; G06F 3/04883; G06F 40/10; G06F 40/126; G06F 40/129; G06F 40/131; G06F 40/109; G06F 40/12; G06F 40/295; G06Q 10/10; G06Q 30/04; G06Q 20/3276; H04N 2201/3266; H04N 1/0036; H04N 2201/0081; H04N 1/00326; H04N 1/00363; H04N 1/00718; H04N 1/00708; H04N 2201/3269; H04N 23/951; H04N 23/634; H04N 23/683; H04N 23/69; H04N 23/72; H04N 1/0035; H04N 2201/3205; H04N 23/62; H04N 1/00334; H04N 1/60; H04N 1/6016; H04N 1/6027; H04N 1/3878; H04N 1/00331; H04N 1/00366; H04N 1/00371; H04N 1/00368; H04N 1/00374; H04N 1/00376; H04N 1/00612; H04N 1/32587; H04N 1/32593; H04N 2201/0017; G06K 7/1404; G06K 7/1447; G06K 7/1413; G06T 2207/30176; G06T 2207/10024; G06T 2207/30168; G06T 7/0004; G06T 3/608; G06T 1/0007; Y10S 209/90; B07C 3/00; B07C 3/006; B07C 3/20; B07C 1/04; B07C 5/00; B07C 5/124; B07C 5/28; B07C 7/00; B07C 7/005; B07C 2301/0066; B07C 2301/0075; B07C 2301/0083; B07C 2301/0091; B65G 2811/06; B65G 2811/0673; B65G 2811/0678; B65G 43/08; B65G 43/00; G07B 17/00467; G07B 17/00459; G07B 2017/00475; G07B 2017/00483; G07B 2017/00491; G07B 2017/005; G07B 2017/00451; G07B 17/00185; G07B 17/00016; G07B 2017/00443; G07B 17/00435; G07B 2017/00725; G07B 2017/00596; G07B 17/00508; G07B 17/00661; G07B 2017/0004

See application file for complete search history.

(56) References Cited

U.S. PATENT DOCUMENTS

| | | | |
|---|---|---|---|
| 7,031,530 B2 | 4/2006 | Driggs et al. | |
| 7,065,261 B1 | 6/2006 | Horie | |
| 7,092,561 B2 | 8/2006 | Downs, Jr. | |
| 7,218,410 B2 | 5/2007 | Ferlitsch | |
| 8,023,725 B2 | 9/2011 | Schwartzberg et al. | |
| 2002/0070149 A1* | 6/2002 | Schererz | B07C 3/02 209/540 |
| 2003/0048925 A1 | 3/2003 | Caillon et al. | |
| 2004/0059462 A1 | 3/2004 | Norris et al. | |
| 2005/0289182 A1 | 12/2005 | Pandian et al. | |
| 2006/0122950 A1* | 6/2006 | Hubler | G01G 19/005 177/1 |
| 2007/0064267 A1 | 3/2007 | Murakata et al. | |
| 2007/0217710 A1 | 9/2007 | Yamaai | |
| 2008/0008378 A1 | 1/2008 | Andel et al. | |
| 2010/0027834 A1* | 2/2010 | Spitzig | G06V 30/186 382/218 |
| 2010/0141991 A1 | 6/2010 | Yoshida et al. | |
| 2012/0200742 A1 | 8/2012 | Hine et al. | |
| 2013/0287265 A1* | 10/2013 | Nepomniachtchi | G06Q 20/3276 382/115 |

OTHER PUBLICATIONS

Jung et al., "Text Information Extraction in Images and Video: A Survey," Pattern Recognition, vol. 37, 2004.

Lehal et al., "A Range Free Skew Detection Technique for Digitized Gurmukhi Script Documents", Sep. 22, 1999, 1999 Proceedings of the Fifth Inter Conf on Doc Analysis and Recognition, 6 pages.

Nixon et al., Feature Extraction and Image Processing for Computer Vision, 3rd Edition, Elsevier, 2012, entire document.

Srihari et al., "Recognizing Address Blocks on Mail Pieces: Specialized Tools and Problem-Solving Architecture", Dec. 15, 1987, AI Magazine, vol. 8, No. 4: Winter, pp. 25-40.

International Search Report and Written Opinion mailed Oct. 4, 2018 in International Application No. PCT/US2018/043154.

International Preliminary Report on Patentability mailed Feb. 6, 2020 in International Application No. PCT/US2018/043154.

\* cited by examiner

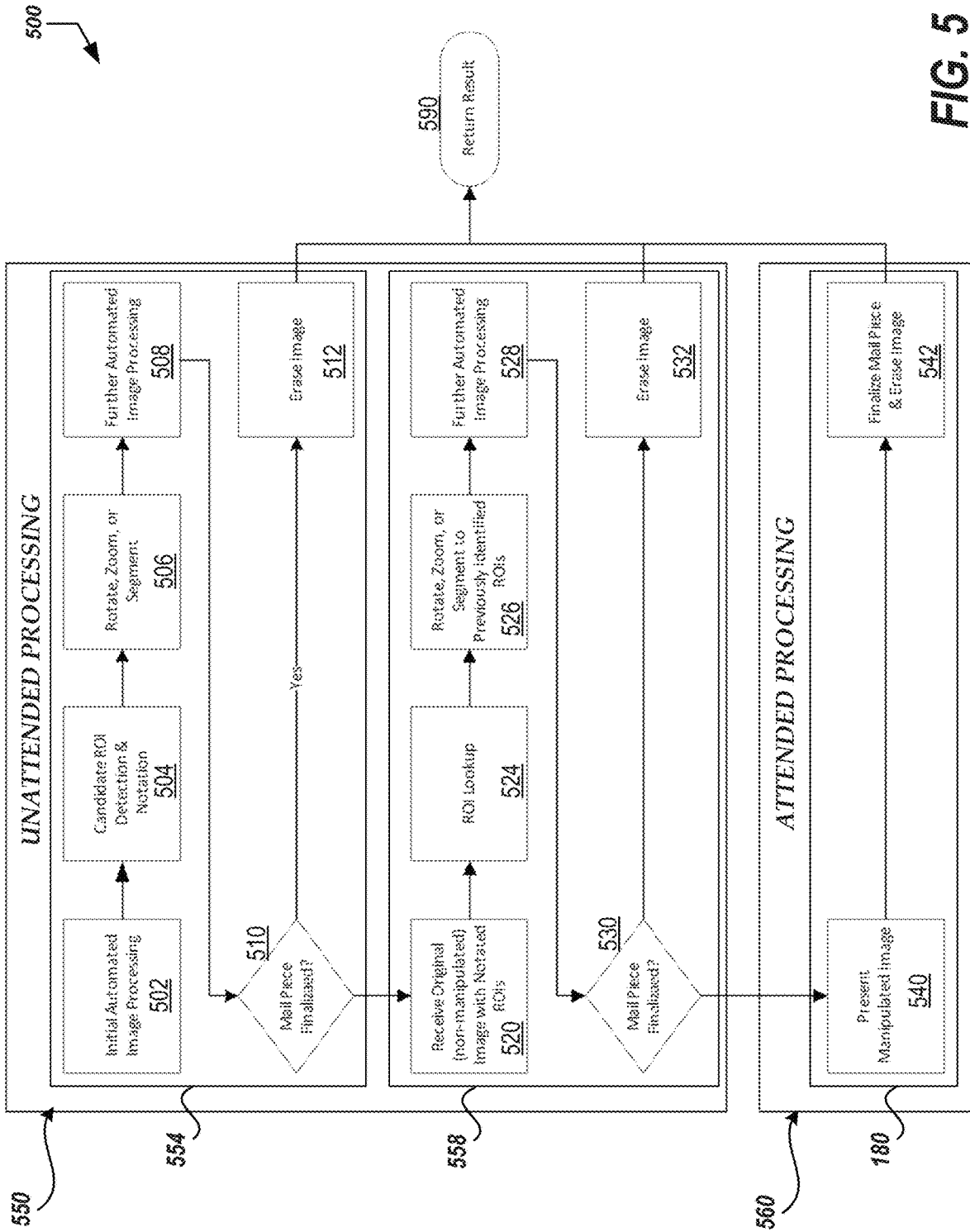

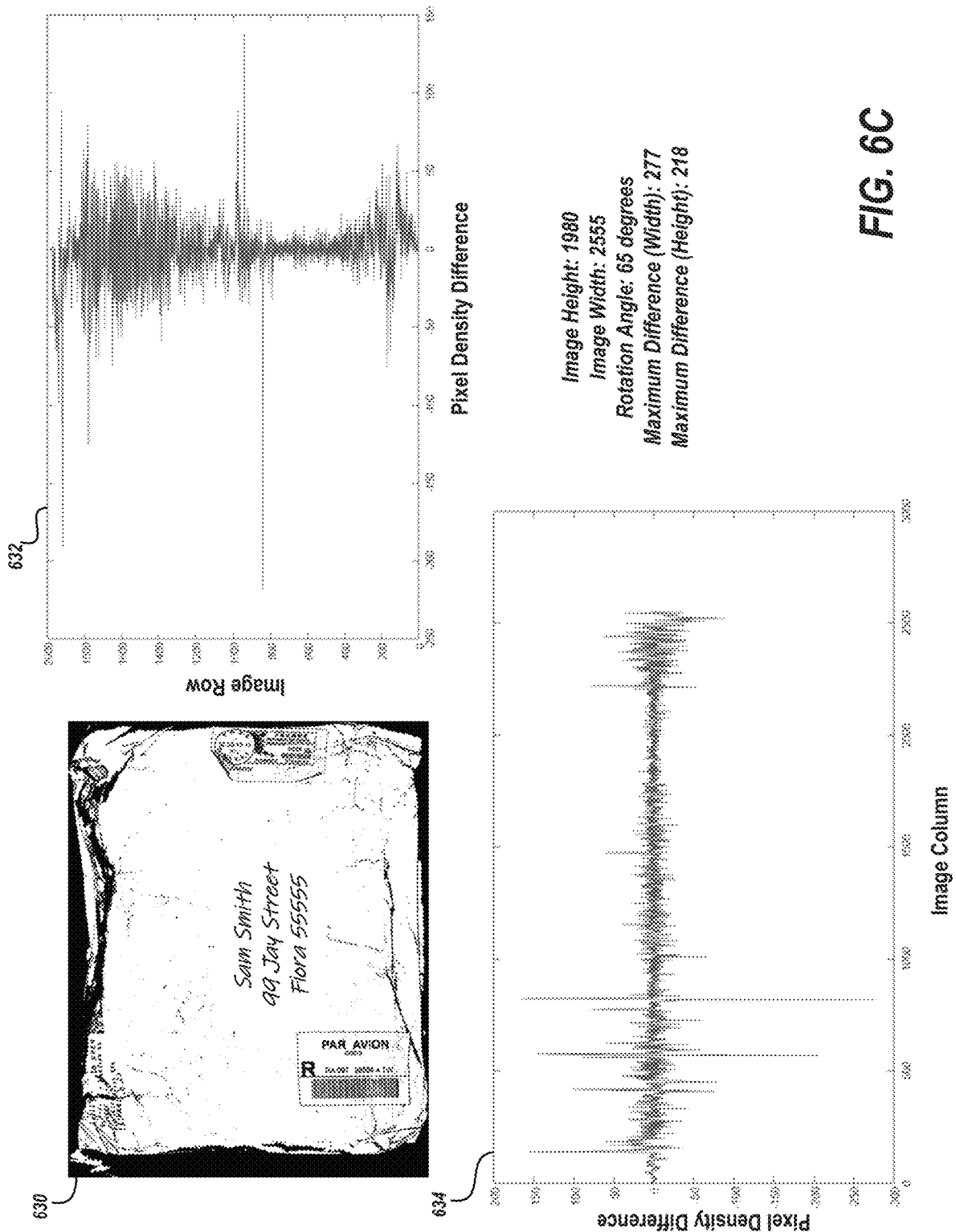

PERSISTENT FEATURE BASED IMAGE ROTATION AND CANDIDATE REGION OF INTEREST

CROSS-REFERENCE TO RELATED APPLICATION(S)

This is a continuation of U.S. application Ser. No. 16/040,344 filed on Jul. 19, 2018, which claims the benefit of priority to U.S. Provisional Application No. 62/536,309 filed on Jul. 24, 2017, the entire contents of each of which are hereby incorporated in their entirety. Furthermore, any and all applications for which a foreign or domestic priority claim is identified in the Application Data Sheet as filed with the present application are hereby incorporated by reference under 37 CFR 1.57.

BACKGROUND

Technical Field

This disclosure relates to image processing, and in particular to persistent feature based image rotation and candidate region of interest of images or portions of images of automatically processed items.

Description of the Related Technology

Items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. The particular groups can correspond to destinations or other information identified on the item. Sorting bulk stacks of items or articles can be done using imaging technology to provide appropriate signals to processing or sorting apparatuses. The ability to accurately process a given item is limited by the effectiveness of the imaging technology to extract accurate information about each item. In the case where the image cannot be processed using artificial intelligence or other automated process, the image may be transmitted to a second system with additional or different analytical resources. The high volume of items processed and sorted can increase the cost and complexity of the sorting means and methods involved. Inefficient sorting systems and methods can lead to significant losses of time over the course of a day or year.

Mail delivery is merely one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for detecting and persisting rotation and region of interest for items in an automated processing system.

In one innovative aspect, a computer-implemented method performed under the control of one or more processors is provided. The computer-implemented method includes obtaining an image of a mail piece on a conveyor, the image showing address information affixed thereto. The computer-implemented method includes receiving, from an optical character recognition system, (i) an electronic text record of characters shown in the image, and (ii) rotation information for the image, the rotation information identifying a number of degrees the image should be rotated to show characters of the address information from left to right with the characters in a standardized orientation. The computer-implemented method includes determining that the electronic text record does not include a set of characters. The computer-implemented method includes generating an enhanced image. The enhanced image includes the rotation information. The computer-implemented method includes adjusting an orientation of the enhanced image based on the rotation information prior to additional processing.

The computer-implemented method may include generating a grey-scale image from the image, and providing the grey-scale image to the optical character recognition system.

The address information may be printed on a label affixed to the mail piece. In such instances, the computer-implemented method may include identifying a type for the label based on an identifier for the label shown the image; receiving a layout template for the type, the layout template identifying a region for the address information; and identifying the rotation information based at least in part on an orientation of the region shown in the image and an orientation of the characters shown within the region in the image. Examples of an identifier for the type include a graphic or a scannable code identifying the type for the label.

The computer-implemented method may include determining that the electronic text record does not include a set of characters comprises evaluating the set of characters using a regular expression. A result of the evaluating may indicate that the electronic text record does not include the set of characters.

The computer-implemented method may include identifying a processing orientation for the mail piece based at least in part on a type for the mail piece; and causing activation of the conveyor to rotate the mail piece from an orientation shown in the image to the processing orientation. The activation may be based at least in part on a difference between the processing orientation and the rotation information.

In some implementations of the computer-implemented method, the image may be a tagged image file format image. When processing such an image file, generating the enhanced image may include adding a rotation notation tagged field to the tagged image format image. The rotation notation tagged field may include at least a portion of the rotation information received from the optical character recognition system.

An example of the further processing is causing display of the enhanced image on a display device. Adjusting the orientation may include rotating the image using the rotation information prior to causing the display.

In a second innovative aspect, another computer-implemented method performed under control of one or more processors is provided. The computer-implemented method includes receiving an image showing an item and address information affixed thereto. The computer-implemented method includes generating an electronic text record of the address information based on optical character recognition of at least a portion of the image showing the address information. The computer-implemented method includes detecting orientation information for the image based on pixel information included in the image. The computer-implemented method includes determining that additional processing of the image is needed to identify routing information for the item based at least in part on the electronic text record. The computer-implemented method includes generating an enhanced image, wherein the enhanced image includes the orientation information. The computer-implemented method includes adjusting an orientation of the enhanced image based on the orientation information prior to the additional processing.

The computer-implemented method may include generating a grey-scale image from the image; providing the grey-scale image to an optical character recognition system; and receiving the electronic text record from the optical character recognition system.

In some implementations, the address information may be printed on a label affixed to the item. The computer-implemented method may method further include: identifying a type for the label based on an identifier for the label shown the image; receiving a layout template for the type, the layout template identifying a region for the address information; and identifying the orientation information based at least in part on an orientation of the region shown in the image and an orientation of the characters shown within the region in the image. The identifier for the type may include at least one of a graphic or a scannable code identifying the type for the label.

Determining that the electronic text record does not include a set of characters may include evaluating the set of characters using a regular expression, wherein a result of said evaluating indicates that the electronic text record does not include the set of characters.

The computer-implemented method may additionally or alternatively include identifying a processing orientation for the item based at least in part on a type for the item; and causing activation of item processing equipment to rotate the item from an orientation shown in the image to the processing orientation. The activation may be based at least in part on a difference between the processing orientation and the orientation information.

The image may be a tagged image file format image. Generating the enhanced image may include adding a rotation notation tagged field to the tagged image format image. The rotation notation tagged field may include the orientation information.

In some implementations of the computer-implemented method, the further processing includes causing display of the enhanced image on a display device, and adjusting the orientation may include rotating the image using the orientation information prior to causing the display.

The computer-implemented method may additionally or alternatively include generating a first binary image based on the image; generating a second binary image based on the image and a rotation angle, the item being shown at a different orientation in the second binary image than the item is shown in the first binary image; generating a pixel density difference metric for individual rows of pixels included in the first binary image; generating a pixel density difference metric for individual columns of pixels included in the first binary image; identifying a first row the first binary image associated with a first pixel density difference metric, the first pixel density difference metric for the first row indicating a level of density higher than other rows of the first binary image; identifying a first column of the first binary image associated with a second pixel density difference metric, the second pixel density difference metric for the first column indicating a level of density higher than other columns of the first binary image; generating a pixel density difference metric for individual rows of pixels included in the second binary image; generating a pixel density difference metrics for individual columns of pixels included in the second binary image; identifying a second row of the second binary image associated with a third pixel density difference metric, the third pixel density difference metric for the second row indicating a level of density higher than: (a) other rows of the second binary image, and (b) the first pixel density difference metric; and identifying a second column of the second binary image associated with a fourth pixel density difference metric, the fourth pixel density difference metric for the second column indicating a level of density higher than: (a) other columns of the second binary image, and (b) the second pixel density difference metric. The orientation information may include the rotation angle.

In a further innovative aspect, an item processing system is provided. The item processing system includes a scanning device configured to acquire an image of an item at a first processing device. The item processing system includes an unattended image processing server. The unattended image processing server is configured to generate an electronic text record of address information shown in the image based on optical character recognition of at least the portion of the image, and generate an enhanced image including orientation information detected during optical character recognition. The item processing system includes an attended image processing workstation. The attended image processing workstation is configured to receive the enhanced image, identify a display orientation for the enhanced image, adjust the enhanced image based on a difference between the display orientation and the orientation information, display the enhanced image as adjusted on a display device, receive an address information input for the enhanced image, and transmit the address information input to the unattended image processing server. The unattended image processing server is further configured to transmit a processing equipment control message to a second processing device to route the item to a location associated with the address information.

The unattended image processing server may be further configured to: receive the image showing the item and address information affixed thereto; detect orientation information for the image based on a location where the address information is affixed to the item; determine that additional processing of the image is needed to identify routing information for the item based at least in part on the electronic text record; and upon determining that additional processing is needed, transmit the enhanced image to the attended image processing workstation.

The unattended image processing server may additionally or alternatively be configured to: generate a first binary image based on the image; generate a second binary image based on the image and a rotation angle, the item being shown at a different orientation in the second binary image than the item is shown in the first binary image; generate a pixel density difference metric for individual rows of pixels included in the first binary image; generate a pixel density difference metric for individual columns of pixels included in the first binary image; identify a first row the first binary image associated with a first pixel density difference metric, the first pixel density difference metric for the first row indicates a level of density higher than other rows of the first binary image; identify a first column of the first binary image associated with a second pixel density difference metric, the second pixel density difference metric for the first column indicates a level of density higher than other columns of the first binary image; generate a pixel density difference metric for individual rows of pixels included in the second binary image; generate a pixel density difference metric for individual columns of pixels included in the second binary image; identify a second row of the second binary image associated with a third pixel density difference metric, the third pixel density difference metric for the second row indicates a level of density higher than: (a) other rows of the second binary image, and (b) the first pixel density difference metric; and identify second column of the second binary image associated with a fourth pixel density difference metric, the fourth pixel density difference metric for the second column indicates a level of density higher than: (a) other columns of the second binary image, and (b) the second pixel density difference metric. The orientation information may include the rotation angle.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 5 is a flow diagram illustrating an embodiment of an example method of dynamic processing of items based on features shown in images of the items.

FIG. 6C depicts a third image of the item shown in FIG. 6A and rotation metrics for the third image.

DETAILED DESCRIPTION

Figure 1:
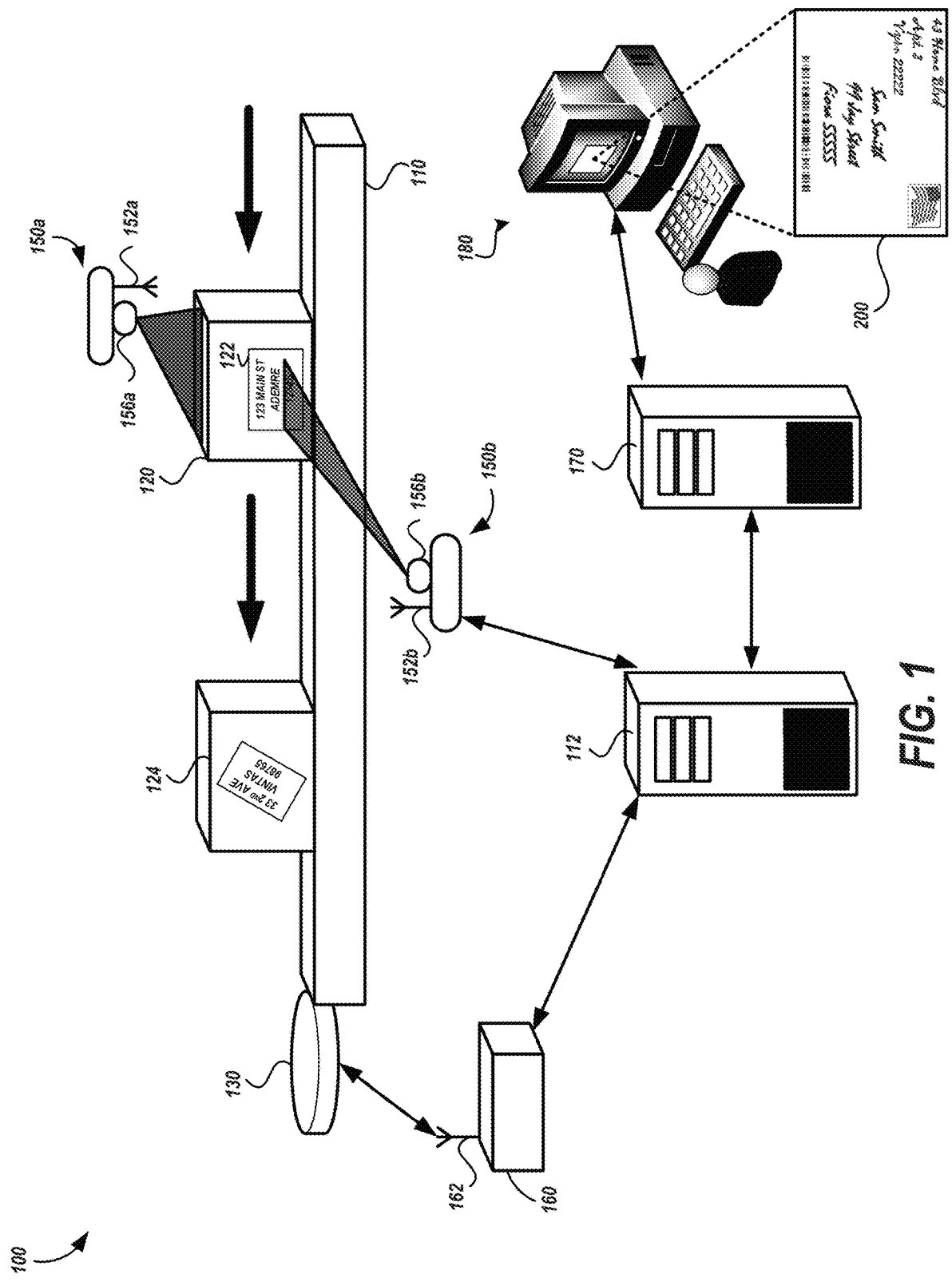
FIG. 1 is a pictorial diagram of an embodiment of system for dynamic processing of items based on image features obtained from images of the items.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

The system described herein provides for faster and more efficient image based processing of items, such as, for example, articles of mail. Processing items may include receiving an item, moving an item from one location to another, or presenting an item at a destination address. The processing of items may include one or more mechanical devices to perform a step in a chain of steps to ultimately present the item for delivery. The mechanical devices may include conveyor belts, pinch belt assemblies, singulation and shingulation assemblies, and the like, which can be driven by one or more motors. The mechanical devices may include gates, diverters, selective pickers, vacuum powered members, and the like, which are configured to restrict or permit items to enter a location, or to divert an item in a particular direction for further processing. The mechanical devices may include autonomous vehicles such as robots, drones, cars, or vans. The mechanical devices may be controlled by a central system configured to determine a proposed or intended path for an item through a distribution network, and to track the item along the proposed or intended path, or through any deviations from that path, from receipt to delivery.

The system may follow an item using multiple scanning devices. The scanning devices may include wireless signal scanners configured to detect wireless signals emitted from an item such as near field communication signals or radio frequency identifier signals. The signals may include information identifying the item. This information may be used to maintain a record of where the item has been and where it is going.

The scanning devices may include optical scanners. An optical scanner may be implemented as a camera. The camera may capture one or more images of an item as it is being processed. The images may be analyzed to determine future steps for processing the item. Cameras can take many forms and provide a wide variety of images. For example, some cameras provide color images while others provide black and white images. Some cameras provide high resolution images while others provide lower resolution images. The information captured by the optical scanner may serve as the input for generating further control messages to adjust the processing equipment to route the item to the proper destination. High resolution cameras tend to include more complex hardware to provide greater detection sensitivity. These cameras can be more expensive to purchase, operate, and maintain than lower resolution cameras. These costs may be weighed against potential gains in the system's ability to process the received images. If the images are of such poor quality that no information can be retrieved therefrom, the processing of the item may be delayed.

The features described provide improved image based processing of items in part by ensuring information obtained during the analysis of an image may be retained and used by subsequent image processing systems. In this way, the expenditure of processing resources to generate image analytics may be passed to downstream systems to avoid an expenditure of additional resources to process the image.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the development described herein may have application in a variety of manufacturing, assembly, distribution, or sorting applications which include analysis of images to provide processing instructions for items shown in the images.

A processing facility may use automated processing equipment to sort items. Where the distribution network is the United States Postal Service (USPS), every day a processing facility receives a very high volume of items, such as letters, flats, parcels, packages, and residual mail pieces, which must be sorted and sequenced for delivery. Sorting and sequencing is accomplished using automated sorting equipment which can scan, read, or otherwise interpret a destination end point located on or associated with each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the address obtained from optical character recognition. In some embodiments, the automated sorting equipment can apply a computer readable code that encodes the delivery end point to the item. In some embodiments, the processing facility uses sorting/sequencing apparatuses which can process 30,000 items per hour. A typical USPS processing facility may also serve 200 or more delivery routes, each with multiple delivery end points. Because of the high volume of mail and the large number of delivery routes, the processing facility must use large equipment which may have a large footprint within the processing facility.

The systems and methods described herein are useful for reducing the amount of time needed to finalize a routing decision for an item based on an image of the item. The automated sorting equipment may require information about each item to make a decision as to what configuration will transport an item to the proper location. The configuration may include selectively adjusting processing equipment such as sorters, conveyor, delivery vehicles, and the like. The proper location may be based on the address information for the item. Some image processing may identify information such as the orientation of the item shown in the image, but may not be able to extract the address information. In current systems, the image may be provided to a workstation configured to receive a user input identifying the address information shown in the image. However, current systems typically require manual adjustment of the image to a proper orientation for analysis. For example, the proper orientation of a letter may include arranging the image such that an indicator of postage is shown in the upper right-hand corner of the image. These current systems may not take into account any prior processing attempts and information generated thereby for the image of the item, including, for example, image rotation information. Features are described to unlock image information gathered at upstream processing equipment for use in downstream image-based item sorting to avoid the expenditure of resources to generate image information that has already been generated by a previous process. For example, when an image cannot be read, the image is sent to a manual operator for interpretation of the image. The operator views the image, analyzes the image, and provides an interpretation, including the destination point for the item. The operator interacts with the image using an input device, such as a keypad. The operator can rotate, zoom, and otherwise manipulate the image using the input device. Experimental data suggests that 20-25% of the keystrokes used during the manual or attended processing of an image are related to image rotation. The features described avoid the need for such inputs thereby improving the overall processing time needed to generate a routing result based on an image of the item or the region of interest on the item.

FIG. 1 is a pictorial diagram of an embodiment of system for dynamic processing of items based on image features obtained from images of the items. The system 100 may include processing equipment to move items from one location to another. As each item may be destined for unique locations, the processing equipment may need to be dynamically adjusted to suit the needs and destination of each item.

The system 100 is shown processing a first item 120 and a second item 124. A conveyor 110 may include motorized locomotive elements to transport the first item 120 through the processing facility. A turntable 130 may be included in the system 100. The turntable 130 may be selectively adjusted to send items in a particular direction, such as into specific sorting bins. The conveyor 110 and the turntable 130 are just two examples of processing equipment that may be included in the system 100 to receive, process, and deliver items. Other examples of processing equipment include: vacuum belts, tilt trays, cross belts, bomb-bay style trap doors, or other conveying mechanisms, bins, robots, trays, forklifts, stackers, printers, sorters (such as Mixed Mail Sorter (MSA-9600) manufactured or sold by Neopost or its affiliates) or the like.

The processing equipment may be controlled using control messages. For example, a controller 160 may transmit a message to the turntable 130 indicating which direction to point for an item that is being processed. The controller 160 may include a wireless transceiver 162 to exchange messages with a control server 112 or processing equipment such as the turntable 130. The messages may be coordinated by the control server 112 such that the processing equipment is in the desired state when the item arrives at the processing equipment.

Scanning devices are additional examples of processing equipment that may be included to track items through the system 100. Optical scanning devices (e.g., optical scanning device 150a and optical scanning device 150b) may capture one or more images of part or all of an item as it is being processed. The optical scanners 150a and 150b may include wireless transceivers 152a and 152b, respectively, for wirelessly transmitting image data to the control server 112. In some implementations, the wireless transceiver 152a may receive control messages from the controller 160. A control message may include parameters for capturing images of the item 120, such as the size of the image, the size of the field to be images, color mode for the image, number of pixels for the image, resolution for the image, or other information to configure a scanner 156a to the capture the image.

As shown in FIG. 1, multiple optical scanning devices may be included in the system 100. The optical scanning device 150a and the optical scanning device 150b may be situated to capture a top image and a side image of the first item 120 using scanners 156a and 156b respectively. In some embodiments, the optical scanners 150a and 150b can have pan-tilt-zoom functionality in order to obtain images of the first item 120a from various directions and angles, and to ensure image quality and readability. Additional scanning devices may be included to capture additional or alternative images of the first item 120. In some implementations, the first item 120 may be rotated to facilitate capturing of images of other portions of the first item 120 without including additional scanners. The coordination of the imaging and rotation may be controlled, in part, through messages from the controller 160.

The images captured by the optical scanning devices may be transmitted to the control server 112 for analysis as described herein. The analysis may include measuring the item or detecting a computer readable code or performs optical character recognition (OCR) of an image of part or all of an item in order to identify various characteristics of the item, such as class of service, addressee, and/or delivery end point. Based at least in part on the information identified in at least a portion of the image of an item, the control server 112 may identify adjustments to the processing equipment to ensure the item is routed to a target destination.

As shown in FIG. 1, an image processing server 170 may be included in the system 100. The control server 112 may include basic image processing, such as optical character recognition. However, some images may be of poor quality, may require rotation or other processing to be analyzed, or may be of sufficient quality but show a label 122 with damages (e.g., smudged, water damaged, ripped, torn, overwritten, etc.) obscuring the information of interest. The image processing server 170 may be a specially configured image processing device for performing detailed image analysis to remove or adjust images requiring such additional processing to obtain the information of interest despite defects in the form or content of the image. For example, the image processing server 170 may include specialized graphics libraries or machine learning models to extract information from an image of an item.

In some cases, even the most sophisticated image analysis systems may not be able to obtain the information of interest from an image. In such instances, a workstation 180 may be included in the system 100. The workstation 180 may be configured to receive an image 200 of an item along with input information about the image 200 such as the return address, the recipient's address, class of postage, or other information shown in the image 200. The input information may also include image manipulation data such as rotation information indicating how an image should be rotated to present the image in a standardized form (e.g., such that the return address is shown in the upper left corner of the image).

In some systems, the workstation 180 may display the image 200 in the same orientation as it was captured. In practice, an agent may manually enter commands to rotate the image into the standardized form. When scaled over the number of items processed in an operation like the United States Postal Service, this can account for thousands of extra seconds of processing time which can account for significant delay in image based item processing.

The image rotation information may be identified as part of the automated image processing performed by the control server 112 or the image processing server 170. In some systems, this rotation information does not persist with the image, thereby requiring each server or each individual piece of item processing equipment to perform its own rotation analysis or request that a manual rotation analysis be performed. This too can account for significant delay in image based item processing.

To facilitate expedited processing of items based on image data, the system 100 may store the rotation information obtained during automated processing in association with the image. For example, the rotation information may be stored within the image file. Some image formats, such as the tagged image file format (TIFF), include tagged fields within the image file for including custom information. The rotation information may be included in a tagged field. Subsequent processing may parse the tagged fields and, if the rotation information is present, alter presentation or processing of the image based on the rotation information. In some implementations, the tagged fields may be included as metadata fields of the image file, stored in predetermined portion of the image file (e.g., interlaced or embedded with image data). In some implementations, the rotation information may be stored in as Exchangeable Image File Format (EXIF) data.

In this way, as the image proceeds through the system 100, information identified by prior servers can be used by the downstream servers. For example, rather than displaying the image 200 upside-down, the workstation 180 may receive the image rotation information and display the image 200 in a customary position (e.g., return address in the upper left corner) or position specified by, for example, user or system preference. This saves time at the workstation 180 that would otherwise be spent rotating the image at a downstream component, and allows analysis of the image to obtain the information needed to process the item such as address information. Although discussed as rotation information, the system 100 may additionally or alternatively store other image characteristics such as skew, zoom, or segments identifying regions of interest of a label on an item (e.g., return address, recipient address, postage, postage class, sorting barcode, etc.). The image may be stored and associated with information about the item shown in the image. For example, the image may include barcode information or return or destination addresses for the item. This information may be used to associate the image with a tracking record for the item in a data base. In some implementations, the storage location of the image may be included in the data base in association with the item record. In some implementations, the data base may be configured to store binary objects such as images, in an item record. The image data may thus be associated with a record for an item so that when the item is next scanned, the image previously obtained and/or analyzed can be referenced.

Figure 2:
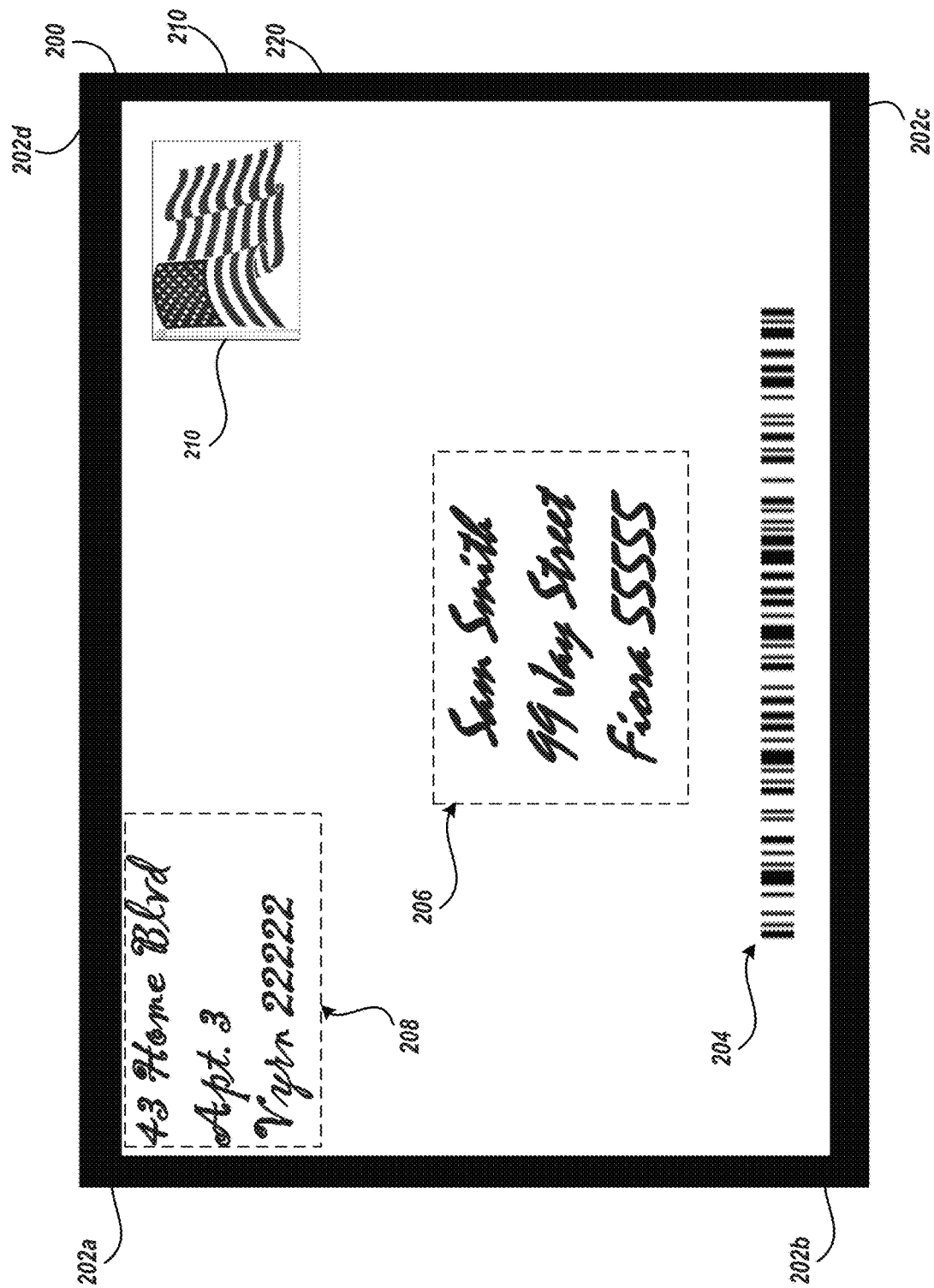
FIG. 2 depicts an example image showing an item that may be processed by the system shown in FIG. 1.

FIG. 2 depicts an example image showing an item that may be processed by the system shown in FIG. 1. The image 200 may include a background region 210 and image data showing an item 220. It will be appreciated that in some implementations, the image 200 may show only a portion of the item 220, such as a portion of one side of a box. The image analysis may include feature detection. Feature detection generally describes processing an image to identify specific characteristics shown (e.g., features). The characteristics may be used to generate a conclusion about the image may be generated (e.g., orientation, content, etc.). For example, the image 200 may depict four corners 202a, 202b, 202c, and 202d. The corners may be detected based on a contrast between the image data showing the item 220 and the background region 210. In some implementations, this may be referred to as edge detection. Once the corners or other features are detected, the distance between the detected features may be calculated. Using the ratio of differences between distances, for example, the short side of a letter may be distinguished from the long side of the letter. This can then be used to orient the image, such as where the long side is shown perpendicular to the bottom of the image 200. Angles formed between detected features may be used in addition or as an alternative identification means. For example, an angle between a corner (e.g., the corner 202a) and a corner of the image may be compared. This can provide an indication of whether the image data showing the item 220 is rotated and, if so, by how much.

Feature detection may also identify regions of content within the image 200 such as a return address region 208, a mailing address region 206, a barcode 204, or postage region 210. The location of these regions relative to each other, the corners, or within the image 200 itself may be used to identify characteristics of the item shown in the image 200. For example, a classification model may be trained using distances between a region and the corners of the item. The distances may be calculated from the center of the region to the respective corner. The distances may be collected as a vector of values and provided to the classification model. Using the vector, the classification model may provide a classification for the region (e.g., return address, mailing address, postage, barcode, unknown). The classification model may also provide a confidence indicating a confidence that the resulting classification is the "correct" classification.

The analysis may also include character recognition. The character recognition may identify specific characters shown in the image 200 such as the ZIP code, street address, type of mailer used for the item (e.g., pre-paid envelope or box), or similar identifying marks that can be identified in the image 200.

Figure 3:
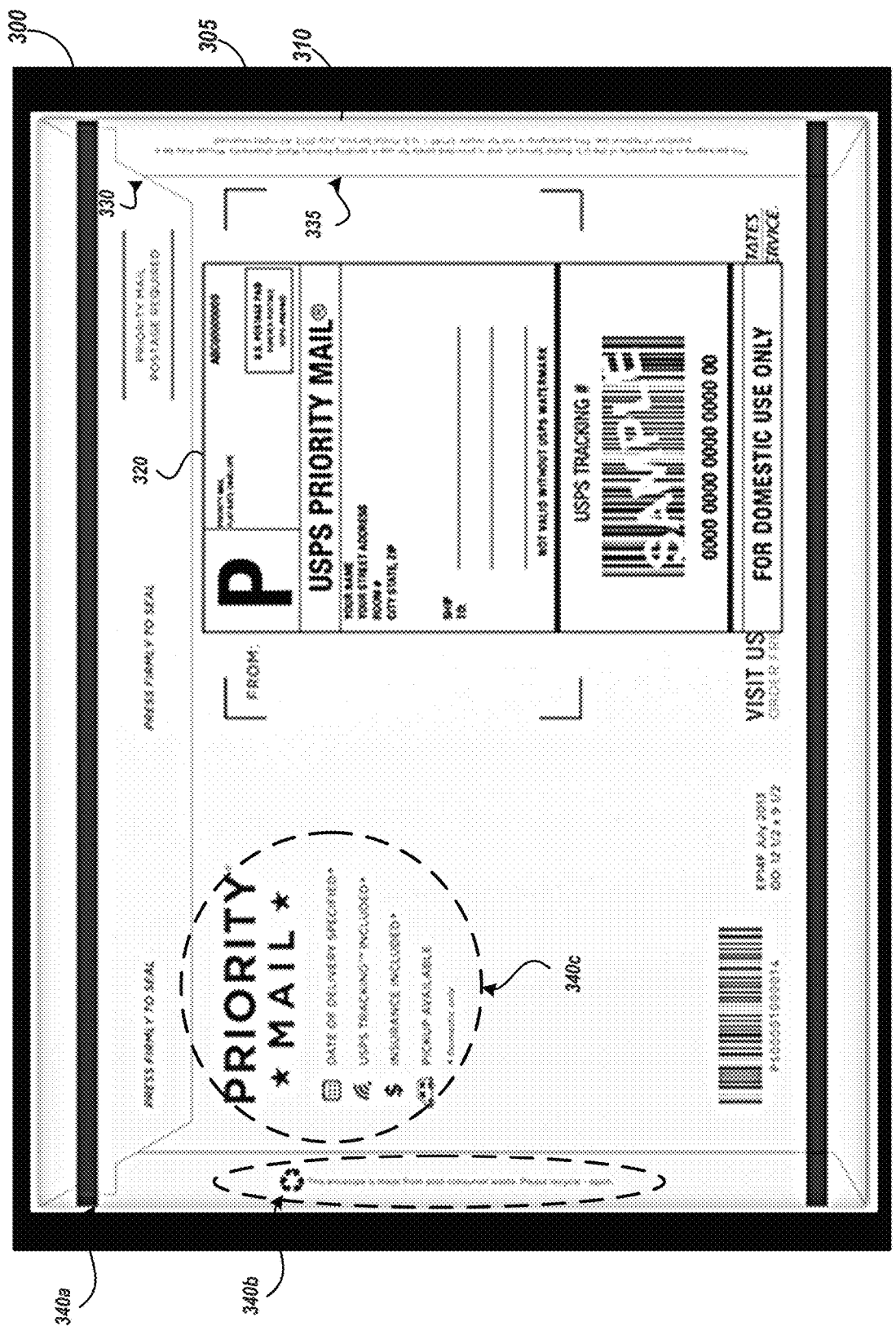
FIG. 3 depicts another example image showing another item that may be processed by the system shown in FIG. 1.

FIG. 3 depicts another example image showing another item that may be processed by the system shown in FIG. 1. The item 310 shown in FIG. 3 is an example of a pre-printed U.S. POSTAL SERVICE® PRIORITY MAIL® envelope. The image 300 may include a background region 305 upon which the item 310 is imaged. The background region 305 may show processing equipment upon which the item 310 is placed.

The image 300 showing the item 310 may depict identifying marks such as graphics 340a, 340b, or 340c. The graphics may appear at predetermined locations on the envelope and thus can be used as features for identifying the item 310 or orientation thereof. The image 300 may depict construction artifacts for the envelope such as a first seam 330 or a second seam 335. The location or orientation of the seams within the image, within the portion of the image showing the envelope, relative to each other, or relative to another feature identified in the image data 300 may be used to identify the envelope or orientation thereof.

The image 300 may show a printed label 320. The printed label 320 may include sorting, processing, and routing information (e.g., recipient mailing address, sender address, class of service, tracking number, postage payment, etc.) in a region of interest. In such instances, the location of the printed label 320 may be identified based on the identified features. In some implementations, the printed label 320 may serve as a feature. The fields and lines of the printed label 320 can be used alternatively or in addition to other indicia. For example, the pattern of boxes and lines on the labels may be standardized, so those lines can be used to identify where the regions of interest are, and for orientation purposes. Consider a label having a specific pattern of horizontal lines from top to bottom in the label. If that pattern is detected in the image as vertical lines, or if the pattern is inverse, then the image may be identified as oriented sideways or upside down from a desired orientation.

Other types of items, such as parcels, flats, and the like, will have their own specific identifying marks that can be used to orient the image of the label or of regions of interest. Although not specifically described here, a person of skill in the art, guided by this disclosure, will understand how to use the features of different types of items for image rotation analysis.

Additional details of feature extraction are described in Feature Extraction and Image Processing for Computer Vision $3^{rd}$ Edition by Nixon and Aguado (Elsevier 2012) which is incorporated by reference in its entirety. Techniques for text information extraction are described in "Text Information Extraction in Images and Video: A Survey" by Jung et al. in Pattern Recognition vol. 37 (2004) which is incorporated by reference in its entirety.

Figure 4:
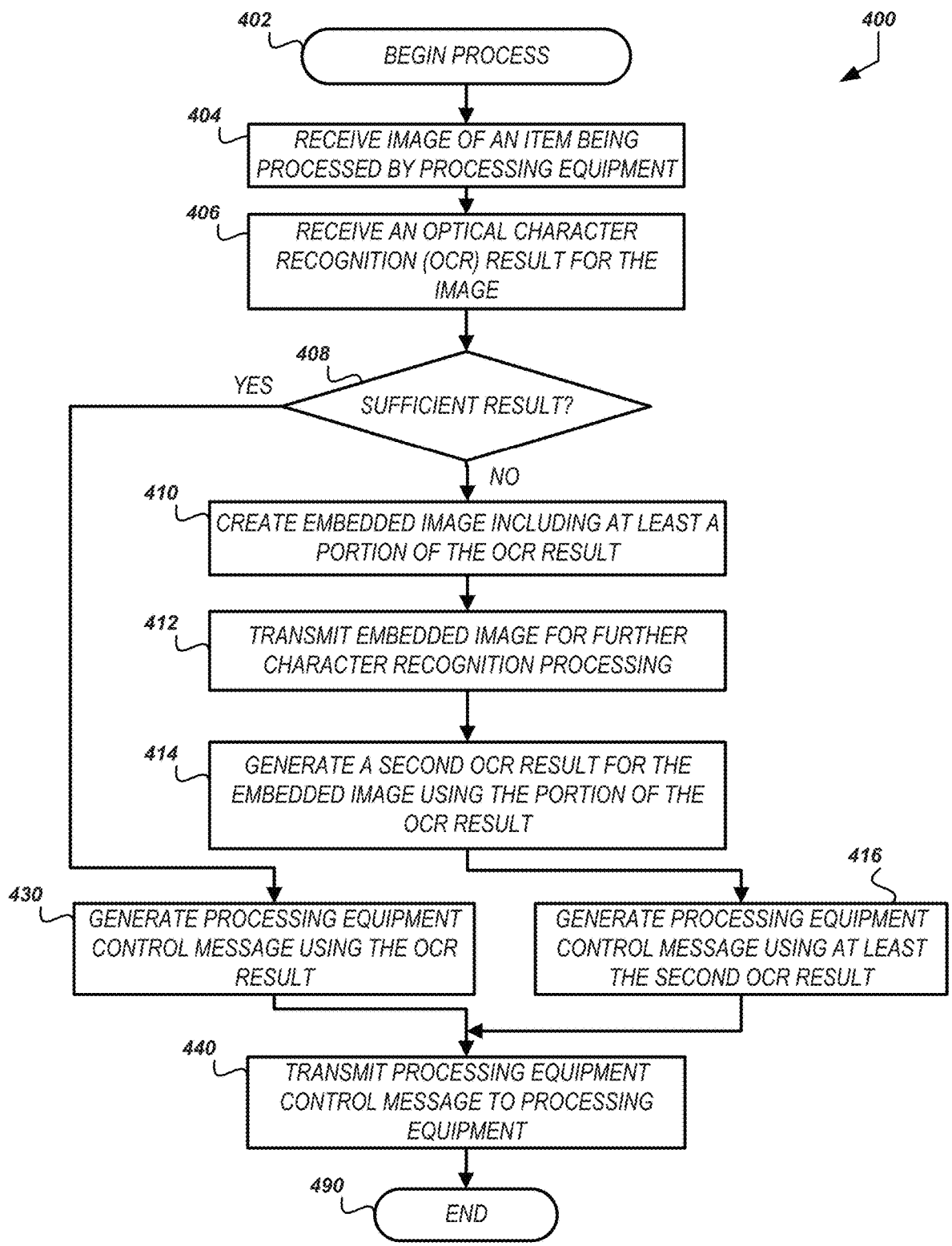
FIG. 4 is a flow diagram illustrating an example method of dynamic processing of items based on features shown in images of the items.

FIG. 4 is a flow diagram illustrating an example method of dynamic processing of items based on features shown in images of the items. The method 400 may be implemented by one or more of the devices described herein. The method 400 illustrates one way an image of an item may be used to generate a control message for processing the item. The method 400 also includes features for minimizing redundant analysis of the image by persisting information from a first analysis and providing this to a downstream process.

The method 400 begins at block 402. The method 400 assumes that an image of the item has been acquired such as by an optical scanning device. At block 404, a control server may receive the image. The image may show an item that is being processed by processing equipment such as a conveyor, turntable, automated postage dispenser, handheld delivery scanner, or the like.

At block 406, the control server may receive an optical character recognition (OCR) result for the image. The OCR result may include a transcript of text identified in the image. The OCR result may include other information about the image such as rotation information, skew, color quality, resolution, image size, etc. The rotation information may be provided as a value identifying a quantity of rotation from a predetermined position. The predetermined position may be based on a standard orientation for the type of item shown in the image. For example, it may be a system standard to orient letters with the postage indicia in the upper right hand corner of the image.

The rotation quantity may be specified in degrees. The OCR result may also include a confidence value indicating a degree of certainty of the text identified in the image. The confidence value may be used in decision block 408 to determine whether the results are sufficient to make further processing decisions. For example, the control server may specify a confidence threshold indicating a level of confidence needed to "trust" the OCR result.

The sufficiency of the result may also depend on the text identified. For example, if the OCR result extracts text at a high level of confidence but a desired information element (e.g., ZIP code) is missing, the OCR result may be deemed insufficient at block 408. The sufficiency of the content of the text identified may be tested using pattern matching such as regular expressions. For example, a regular expression may identify a sequence of characters or character types required to be deemed sufficient. In some implementations, a sequence of expressions may be included to account for different formats for different mail items. For example, a first expression may distinguish domestic mail from international mail while a second expression may be included to identify domestic postal codes.

If the determination at block 408 is affirmative, the text result may be deemed to include sufficient information for further automated processing of the item. At block 430, the control server may generate a processing equipment control message using the text result. The control message may include one or more configuration parameters for adjusting one or more of element of the processing equipment to move the item to a desired location as identified by the text result. The control message may identify a force, direction for the force, time to apply the force, or other dynamically adjusted parameter of the processing equipment.

At block 440, the control server or a controller coupled therewith may transmit the equipment control message to the processing equipment. In some implementations, the equipment control message may be broadcast to more than one element of processing equipment included in the system. Each element may self-adjust based on the received equipment control message. For example, the message may indicate a destination location. To avoid having the control server or the controller maintaining information about the equipment between the item's current location and the destination location (e.g., available processing paths, equipment failures, equipment jams, etc.), the equipment may self-adjust to identify a route for the item to the destination location. The destination location may be identified based on at least a part of the text result (e.g., the ZIP code). Destination locations may be stored in a database or look up table in association with one or more ZIP codes. The control server may query the database or look up table using the ZIP code included in the text result to identify the destination location. The destination location may identify a location within the processing facility (e.g., sorting bin, delivery bay, etc.) or outside the processing facility (e.g., another processing facility, a recipient's address, baggage carousel, etc.) to which the item should be sent or in which the item should be placed for further processing of the item as the item is moved to its ultimate delivery destination. Once transmitted, the method 400 may end at block 490.

Returning to block 408, if the OCR result is deemed insufficient, at block 410, an embedded image including at least a portion of the OCR result is generated. The embedded image may be generated by the device that generated the OCR result such as the control server or the image processing server. Generating the embedded image may include including the rotation information in a portion of the file such as a tagged field within a TIFF file. Generating the embedded image may include converting the image received from the optical scanning device from color image to another color mode (e.g., black and white or greyscale). The conversion of a color image to another color mode may include obtaining the color values for a pixel (e.g., red, green, and blue) and converting the color values into a grey value or a binary value (e.g., black or white). The conversion may include averaging the three color values to provide the grey value. The average may be compared to a threshold if conversion to black and white is desired. Conversion may include desaturation of the color value or color channel selection (e.g., select one of the red, green, or blue channels as the grey or black).

At block 412, the embedded image or a reference thereto may be transmitted for further character recognition processing. For example, the control server may transmit the embedded image to the image processing server. As another example, the image processing server may transmit the embedded image to an image processing workstation.

At block 414, a second OCR result may be generated by the device receiving the embedded image. The generating of the second OCR result may be based at least in part on the OCR results embedded in the embedded image. For example, if the rotation information is included in the embedded image, the generating of the OCR result may include rotating the image before display or processing. In this way, the second OCR result may be generated without performing analysis performed by a previous device. The second OCR result may be generated using unattended (e.g., absent user input) or attended (e.g., based on user input) processing. In the case of attended processing, the OCR result may include user input identifying at least a portion of the address information for the item received via a workstation.

At block 416, a processing equipment control message may be generated using at least the second OCR result. As noted, an OCR result may include a transcript identifying the text shown in the image. The text may include information about the item, its source, or its destination. This information may be used to generate one or more processing equipment control messages to route the item from its current location to its destination. The control message generated at block 416 may be transmitted to the processing equipment at block 440 as described above. The method 400 may end at block 490.

FIG. 5 is a flow diagram illustrating an embodiment of an example method of dynamic processing of items based on features shown in images of the items. The method 500 shown in FIG. 5 is an example implementation including features of the method 400 shown in FIG. 4. The embodiment shown in FIG. 5 may include two portions of processing, an unattended processing portion 550 and an attended processing portion 560. The unattended processing portion 550 may include a first phase 554 that may be performed by one of the devices included in a system for dynamic processing of items based on image features obtained from images of the items such as the control server 112 shown in FIG. 1. The unattended processing portion 550 may include a second phase 558 that may be performed by another of the devices included in the system such as the image processing server 170 shown in FIG. 1. The attended processing may be performed by a workstation such as the workstation 180 shown in FIG. 1. The method 500 shown in FIG. 5 illustrates the types of image processing that may be performed and how the results of that processing may be associated with the image for use in downstream processing.

At block 502, initial automated image processing may be performed by the control server. The initial processing may include confirming that the image was captured or received from an authorized device. The authorization may be based on information included in the image (e.g., metadata) or information included in a message requesting processing of the image. The initial processing may include feature detection. The feature detection may be based on a type for the item shown in the image. For example, if the item shown in the image is a Priority Mail envelope, a layout template may be specified to identify regions of the image that may include the information of interest.

At block 504, results of the initial processing may be received such as from an image preprocessor. The results of preprocessing may include identification of a candidate region of interest (ROI) and notation. The candidate region of interest may be a feature detected at block 502. A region of interest may include return address region, recipient address region, barcode region, or the like.

At block 504, the control server may determine, based on the initial processing results, the image may need to be altered such as by rotating, zooming, or segmenting the image. The determination may be based on whether a candidate region of interest was identified. The determination may be based on where the region of interest was identified within the image. The determination may be based on whether a region identified was associated with notation information describing the region (e.g., return address region, recipient address region, barcode region). The determination may be based on the confidence for any notation information. Adjusting the image may include generating a new file including the adjusted image. In this way, the original "raw" image received from the scanning device may be preserved. Further details of rotating an original image are described in further detail with reference to FIG. 8 below.

After altering the image, at block 508, the control server may attempt to further process the adjusted image. The processing at block 508 may include attempting OCR on one or more of the identified regions of interest. At block 510, based on the results of the further processing, a determination may be made as to whether the item (e.g., mail piece, luggage, garment, etc.) is finalized. Finalization may include determining whether the OCR provided the information needed to process the item such as a destination ZIP code. If the determination at block 510 is affirmative, the image may be erased from the system to protect the privacy of the sender or recipient. The method 500 may end at block 590 by providing a result of the finalization. In some implementations, the result may be the destination ZIP code or other information extracted from the image of the item used to process the item.

Returning to block 510, if the mail piece shown in the image is not finalized, the original non-manipulated image may be provided to the image processing server for more detailed analysis. The image and notated ROIs may be received by the image processing server at block 520. The notated ROIs may be included within the image file such as in one or more tagged fields or the image metadata.

At block 524, the ROI may be identified using the ROI notations information included in the image file that was previously generated by the control server in the first phase 554. Without this notation information, the device performing the second phase 558 processing may need to perform the notation analysis anew. Instead, the ROI notation becomes a look up of information included in the image file. The identification may include extracting the ROI notations from the image file such as from a tagged portion of a TIFF file or a metadata field.

At block 526, the image processing server may rotate, zoom, or segment the image file using the identified ROI notation information. This can provide an improvement in the second phase 558 processing because the method 500 may not need to analyze the image file again, as in the first phase 554.

At block 528, the second phase 558 may perform further automated image processing. The further processing may include more detailed analysis of the image file such as more resource intensive optical character recognition. The resources may include more robust recognition models, higher resolution image processing hardware or software, or the like. The further processing may include additional segmentation, rotation, or zooming of the image. The further processing may store this additional information in the image file as described above. In the example shown in FIG. 5, because the first phase 554 may be unable to acquire the information necessary to finalize a decision for the item, the second phase 558 may perform additional or different analytics on the image file to arrive at a decision for the item.

At block 530, based on the results of the further processing from block 528, a determination may be made as to whether the item (e.g., mail piece, luggage, garment, etc.) is finalized. Finalization may include determining whether the OCR provided the information needed to process the item such as a destination ZIP code. If the determination at block 530 is affirmative, the image may be erased from the system to protect the privacy of the sender or recipient. The method 500 may end at block 590 by providing a result of the finalization. In some implementations, the result may be the destination ZIP code or other information extracted from the image of the item used to process the item.

Returning to block 530, if the mail piece is not finalized, the manipulated image may be provided to the attended processing portion 560. The attended processing portion 560 may include providing the image file to a workstation such as the workstation 180 shown in FIG. 1. The workstation 180 may present the image file at block 540. The presentation may include adjusting the display of the image file based on the ROI notation information generated by the first phase 554 or the second phase 544 that may be included in the image file. Absent the ROI notation information, the image file may need attended adjustments to arrange the display to a desired or standard format. This can account for significant delays in the processing of image files as even seconds of time can, when multiplied over thousands or millions of image files, introduce substantial inefficiency to the handling of the items shown.

At block 542, the mail piece may be finalized. Finalization at block 542 may be a terminal decision since, by block 542, unattended and attended processes have attempted to identify the necessary information from the image file. One finalization decision may be that the mail piece is undeliverable due to insufficient or damaged address information. This determination may be provided as the result returned at block 590. In some implementations, the finalization decision may include a user input value for the information needed to route the item shown in the image file. For example, the workstation 180 may include a keypad for receiving a ZIP code input. A user may view the properly oriented and zoomed image file and enter the ZIP code using the keypad. This input may then be associated with the mail piece and provided as the returned result at block 590.

It will be appreciated that the unattended processing portion 550 may include additional phases or only one phase. However, the ROI notation information from the unattended phase(s) may be accumulated within the image file and presented to the attended processing phase portion 560 if the image file cannot be finalized by the unattended processing portion 550.

Figure 6A:
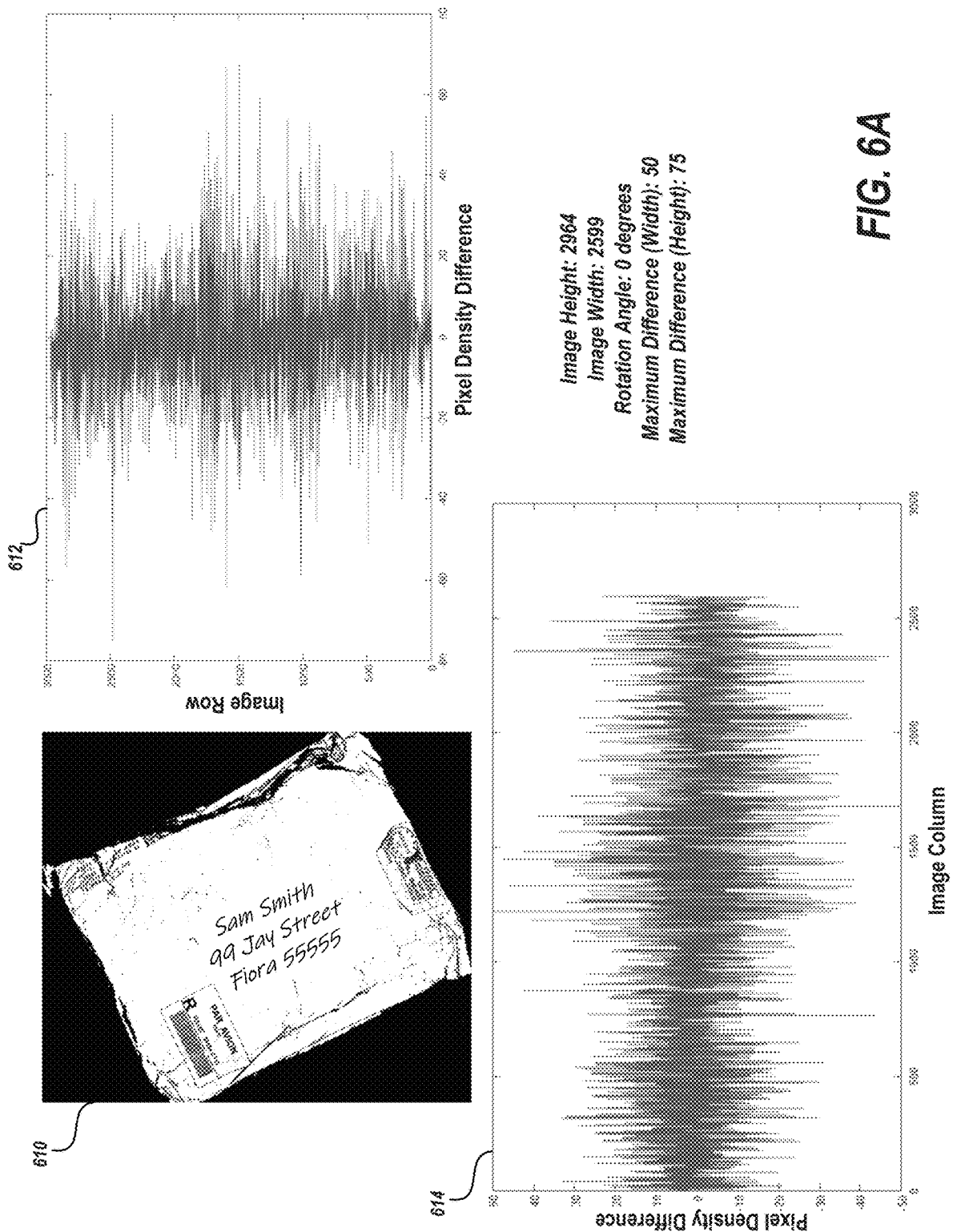
FIG. 6A depicts a first image of an item and rotation metrics for the first image.

FIG. 6A depicts a first image of an item and rotation metrics for the first image. The first image 610 is a binary image meaning each pixel is assigned either an on value (e.g., white) or an off value (e.g., black). Using this binary image, the density of on pixels as compared to off pixels can be compared. The difference between on pixels in an area versus off pixels in the area may be referred to as the pixel density difference. As shown in FIG. 6A, two pixel density difference metrics may be generated. A first graph 614 shows the column pixel density differences for the columns of pixels in the image. A second graph 612 shows the row pixel density differences for the rows of pixels in the image. In FIG. 6A, no image rotation has been applied and the first image 610 shows the item in the position at the time the image was captured (e.g., "raw image").

Figure 6B:
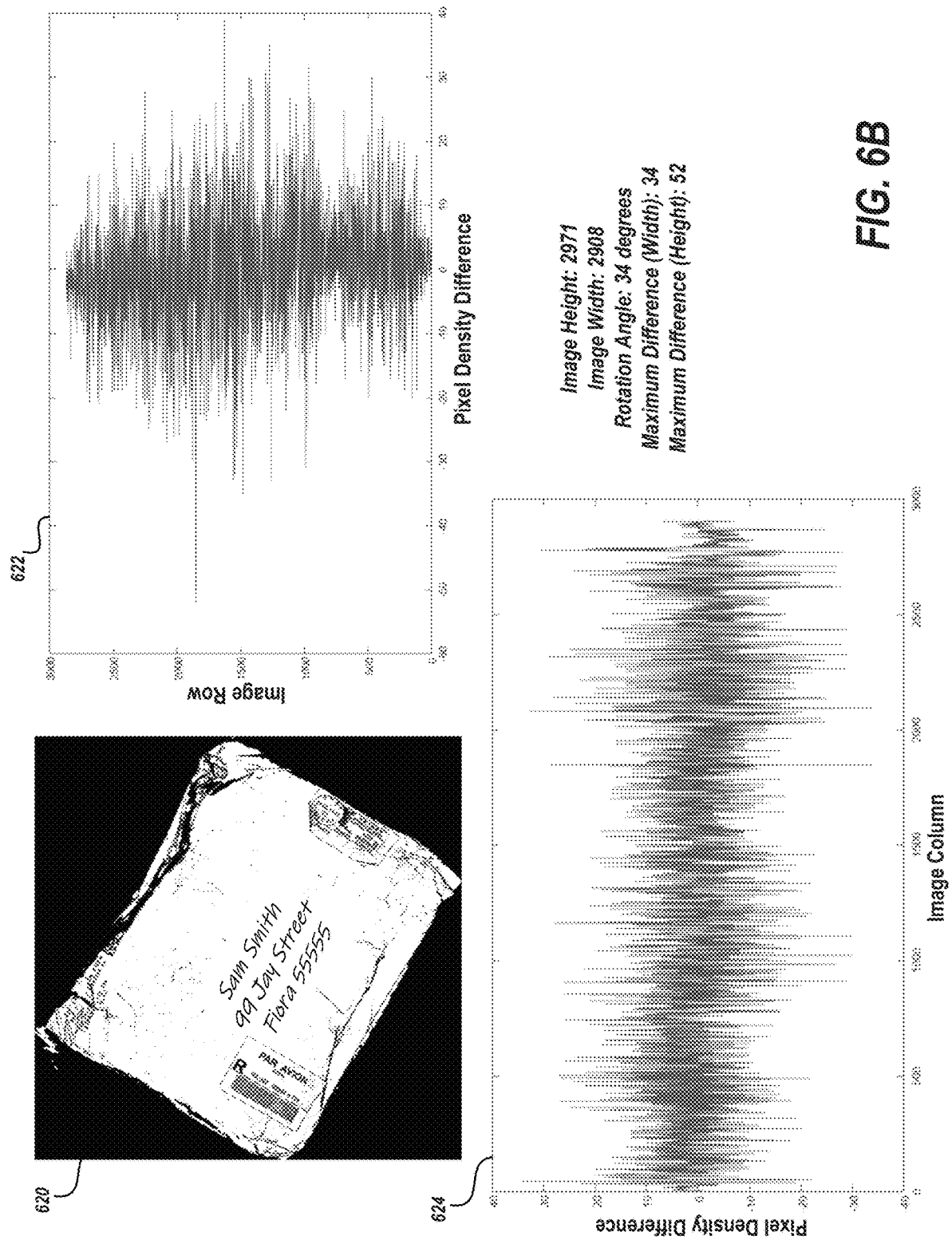
FIG. 6B depicts a second image of the item shown in FIG. 6A and rotation metrics for the second image.

FIG. 6B depicts a second image of the item shown in FIG. 6A and rotation metrics for the second image. The second image 620 is a version of the first image 610 rotated 34 degrees. After rotation, the second image 620 was also trimmed to remove excess black space. Similar image metrics may be generated for the second image 620 as were generated for the first image 610. A comparison between the metrics provides an assessment of whether the image is oriented in a standard position (e.g., so the border of the image is parallel to the edge of the item shown). As in FIG. 6A, the pixel density differences are still quite low thus indicating further rotation may be needed. A first graph 624 and a second graph 622 show the differences for columns and rows of the second image 620.

FIG. 6C depicts a third image of the item shown in FIG. 6A and rotation metrics for the third image. The third image 630 is a version of the first image 610 rotated 65 degrees. After rotation, the third image 630 was also trimmed to remove excess black space. Similar image metrics may be generated for the third image 630 as were generated for the first image 610. A comparison between the metrics provides an assessment of whether the image is oriented in a standard position (e.g., so the border of the image is parallel to the edge of the item shown). Unlike FIG. 6A or 6B, the maximum pixel density difference for the third image 630 well exceeds the previous maximum. This indicates that the rotation angle for the third image 630 adequately presents the item for further processing.

Figure 7:
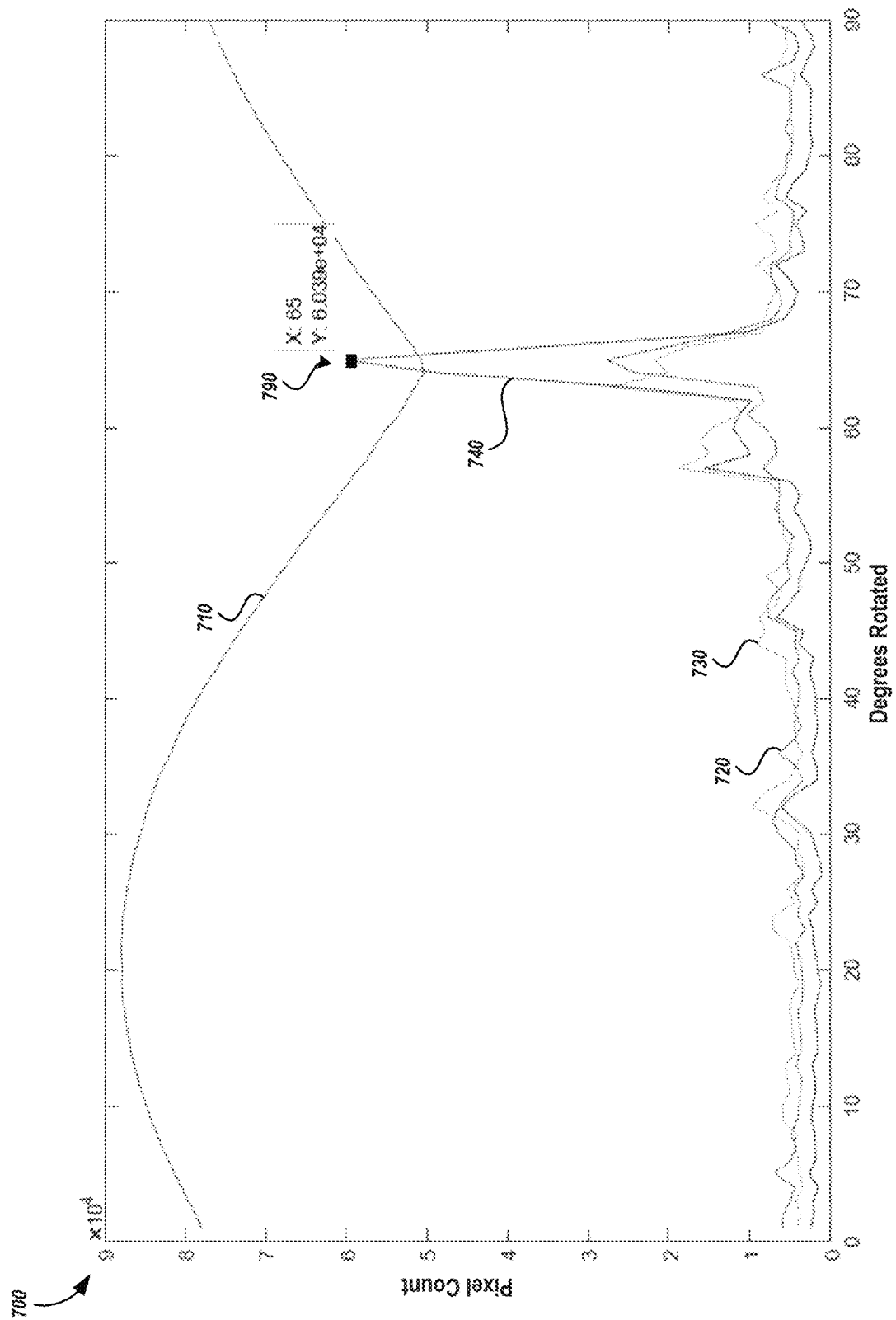
FIG. 7 is a plot diagram summarizing rotation metrics for images of the item shown in FIG. 6A at different rotation angles.

FIG. 7 is a plot diagram summarizing rotation metrics for images of the item shown in FIG. 6A at different rotation angles. In some implementations, the identification of a proper rotation angle may be performed as an optimization problem. As shown in FIG. 7 the image metrics plotted include a first plot 710 indicating the image area (e.g., image size in pixels) for various rotation angles, a second plot 720 indicating the maximum pixel density difference for rows of the image at various rotation angles, a third plot 730 indicating the maximum pixel density difference for columns of the image at various rotation angles, a fourth plot 740 indicating the maximum composite pixel density difference (e.g., product of the maximum row density and maximum column density) for various rotation angles. The optimization parameters for the implementations shown in FIG. 7 include size and composite pixel density difference. An optimal rotation angle 790 is shown as about 65 degrees.

Figure 8:
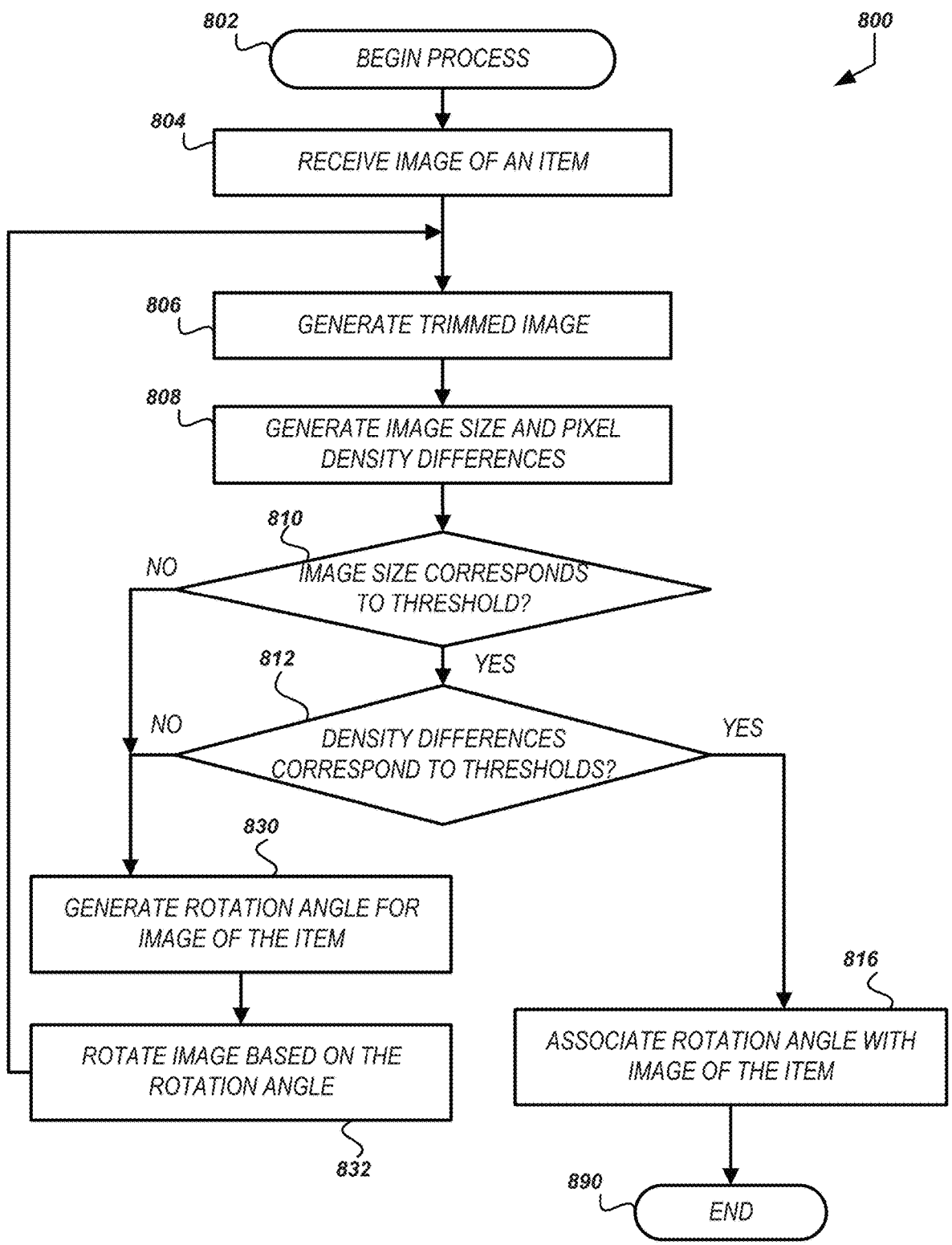
FIG. 8 is a flow diagram illustrating an embodiment of an example method of identifying an optimal rotation for an image showing an item.

FIG. 8 is a flow diagram illustrating an embodiment of an example method of identifying an optimal rotation for an image showing an item. The method 800 shown in FIG. 8 may be implemented by one or more of the devices shown and described in this application such as the control server 112 or the computing device described below in FIG. 9. The method 800 begins at block 802. At block 804, the control server may receive an image of an item. The image may be color image or black and white image of an item such as a mail piece or other physical item. Because the item may be undergoing automated processing, the item may not be oriented in a standard position when imaged. Therefore, the method 800 may be used to identify a rotation angle most likely to present the image in a standard position.

At block 806, the image may be trimmed. Trimming the image may include cropping the image to the smallest size that still shows the item. Trimming may include identifying an area included starting at a border of the image, where pixels in the area have similar attributes (e.g., color). Once the area is identified, the image may be reduced in size to remove the area. The reduced image may be referred to as a trimmed image.

At block 808, the control server generates image metrics for the trimmed image. The image metrics may be used to characterize properties of the trimmed image such as the size of the image or the pixel density of the trimmed image. The pixel density may be generated for portions of the trimmed image such as specific rows or columns of the image. In some implementations, the pixel densities are generated for a sampling of rows or columns (e.g., every fifth column). The specific sampling may be specified using a configuration stored in a memory accessible by the control server.

The pixel density may indicate a level of density of pixels having a specific property. For example, in a binary image, the pixel density may be expressed as a difference between black pixels and white pixels. As shown in FIGS. 6A through 6C, the higher the pixel density difference from one row or column to an adjacent row or column, the more likely the image is to be oriented with the edges of the item parallel to the edges of the image.

At block 810, a determination is made as to whether the image size corresponds to a threshold image size. The threshold image size indicates an acceptable image size for processing. For example, after trimming the image, the trimmed image may be too small for downstream processing such as optical character recognition. To account for this limitation, the method 800 may compare the trimmed image size with the threshold image size. If the determination at block 810 is negative, the method 800 may proceed to block 830.

At block 830, the control server may generate a rotation angle for the image of the item. The rotation angle may be a value between 0 and 90 degrees. In some implementations, the generation may be based on previous iterations of the method 800 for the image. For example, it may be desirable to treat the rotation angle generation as a search problem whereby the space to be searched is 0 to 90 degrees. In such instances, the first iteration may use 45 degrees and then compare a result (e.g., pixel density or image size) with a previous iteration. In some implementations, the rotation angle may be dynamically generated based on the image metrics. For example, there may be a relationship between maximum pixel density difference for a row or a column and the rotation angle. Equation 1 is one example expression of such a relationship.

$$\text{rotation} = 30 * \frac{\text{density}_{w-avg} - \text{density}_{w-max}}{\text{density}_{w-avg}} \quad \text{Equation (1)}$$

where $\text{density}_{w-max}$ is the maximum density for a row of the image; and $\text{density}_{w-avg}$ is the average density for the rows of the image.

At block 832, the control server may rotate the image based on the rotation angle generated at block 830. The rotated image may be stored in associate with the image received at block 804. In some implementations, metadata for the image may be updated to include the rotation angle. The rotated image may then be received at block 806 as described above for further manipulation as described.

Returning to block 810, if the image size corresponds to the threshold, other image metrics of the trimmed image may also be assessed at block 812. As shown in FIG. 8, the pixel density differences may be compared to thresholds. The comparison may be based on a static thresholds provided in a configuration accessible to the control server. For example, a table identifying acceptable ranges of pixel density differences (e.g., maximum, minimum, or average) for specific image dimensions may be included as a configuration. In some implementations, the pixel density differences for the height may be assessed separately from the pixel density differences for the width.

If the determination at block 812 is negative, the method 800 may continue to block 830 as described. If the determination at block 812 is affirmative, then the trimmed and possibly rotated image is both sufficiently sized and oriented in a standard position for further processing. At block 816, the rotation angle may be associated with the image of the item as described above. In some implementations, the trimmed image or a rotated copy of the trimmed image may be stored in association with the image received at block 804. In some implementations, it may be desirable to further process the rotated image. For example, the rotation angle may situate a square item in an image such that the border of the image is parallel with the edges of the item shown. However, the address information shown on the item may be upside down. In such instances, additional image processing may be performed to further identify the orientation of the item and rotate as needed. The additional processing may be based on, for example, an identifier located on a label or packaging for the item.

The method 800 may end at block 890. However, the method 800 may be repeated to process additional images.

Figure 9:
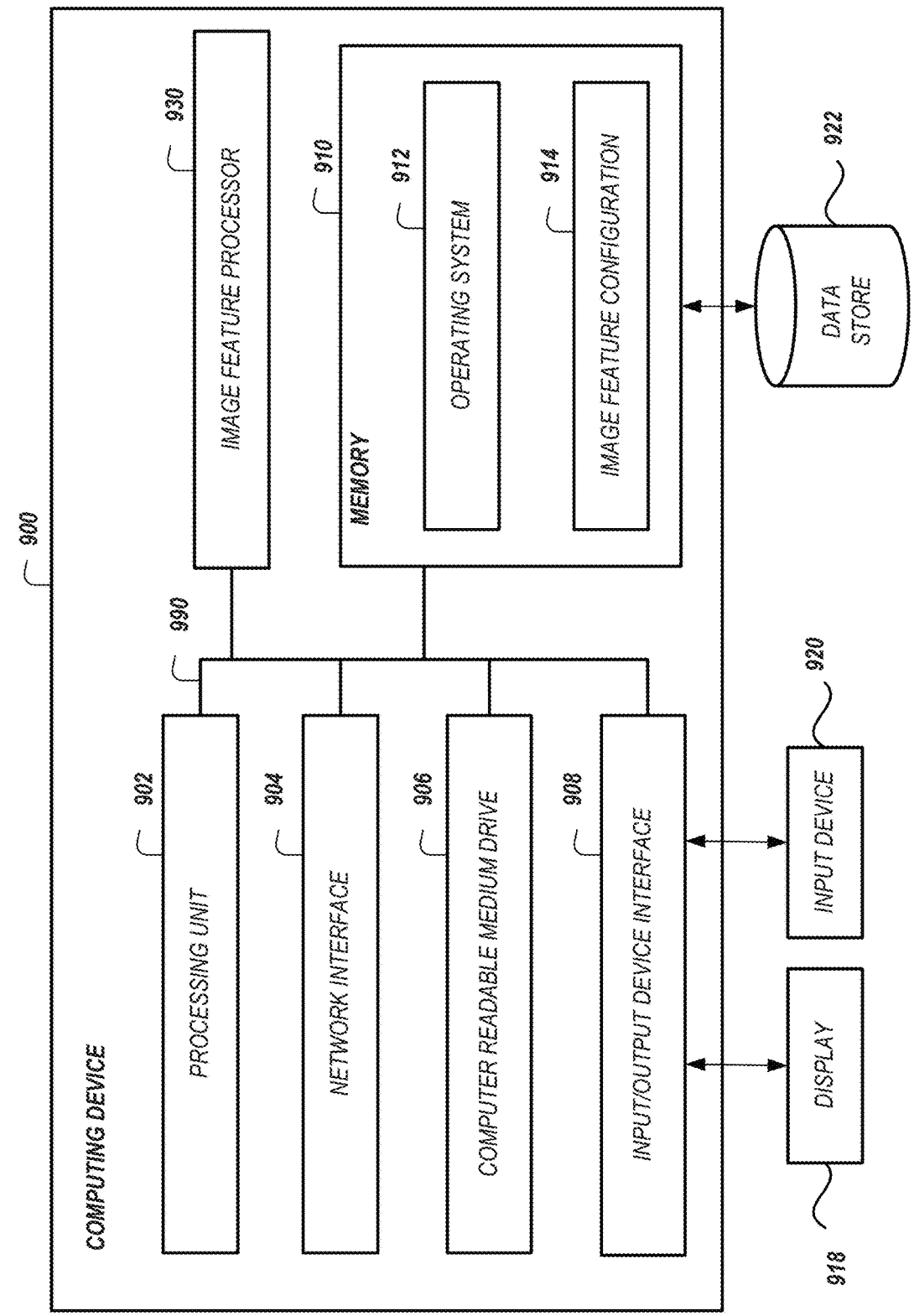
FIG. 9 is a block diagram of an embodiment of a computing device for dynamic processing of items based on image features obtained from images of the items.

FIG. 9 is a block diagram of an embodiment of a computing device for dynamic processing of items based on image features obtained from images of the items. The computing device 900 can be a server or other computing device, and can comprise a processing unit 902, an image feature processor 930, a network interface 904, a computer readable medium drive 906, an input/output device interface 908, and a memory 910. The computing device 900 may implement the features of one or more of the control server 112, the image processing server 170, or workstation 180. The computing device 900 may be configured to perform all or a portion of the method shown in FIG. 4, 5 or 8.

The network interface 904 can provide connectivity to one or more networks or computing systems. The network interface 904 can receive information and instructions from other computing systems or services via the network interface 904. The network interface 904 can also store data directly to memory 910. The processing unit 902 can communicate to and from memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more embodiments. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some implementations, store information for obtaining values for a given configuration. For example, an address information extraction service implementing the regular expressions for identifying the address information or identify destination location information extracted from an image may be specified as a network location (e.g., URL) in conjunction with username and password information to access the service. In such implementations, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 9. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

The variety of features of an image based item processing system described may be included in one or more embodiments. Embodiments of a system and method for sorting and delivering articles in a processing facility based on image data are described. Image processing results such as rotation notation information may be included in or with an image to facilitate downstream processing such as when the routing information cannot be extracted from the image using an unattended system and the image is passed to an attended image processing system. The rotation notation information may be used to dynamically adjust the image before presenting the image via the attended image processing system.

For example, the features may be included in a computer-implemented method. The method may be performed under control of one or more processors. The method may include obtaining an image of a mail piece on a conveyor, the image showing address information affixed thereto. The method may include receiving, from an optical character recognition system, (i) electronic text record of characters shown in the image, and (ii) rotation information for the image, the rotation information identifying a number of degrees the image should be rotated to show characters of the address information from left to right with the characters in a standardized orientation. The method may include determining the electronic text record does not include a set of characters. The method may include generating an enhanced image, wherein the enhanced image includes the rotation information. The method may also include adjusting an orientation of the enhanced image based on the rotation information prior to the additional processing.

Some implementations of the computer-implemented method may include generating a grey-scale image from the image and providing the grey-scale image to the optical character recognition system. The address information may be printed a label affixed to the mail piece. In such implementations, the method may include identifying a type for the label based on an identifier for the label shown the image and receiving a layout template for the type, the layout template identifying a region for the address information. The method may then identify the rotation information based at least in part on an orientation of the region shown in the image and an orientation of the characters shown within the region in the image. In some implementations, the identifier for the type may include at least one of a graphic or a scannable code identifying the type for the label. Determining that the electronic text record does not include a set of characters may include receiving a result from a regular expression identifying the set of characters indicating the electronic text record does not include the set of characters. Some implementations of the method may include identifying a processing orientation for the mail piece based at least in part on a type for the mail piece causing activation of the conveyor to rotate the mail piece from an orientation shown in the image to the processing orientation. For example, the activation may be based at least in part on a difference between the processing orientation and the rotation information. The image may include a tagged image file format image. In such instances, generating the enhanced image may include adding a rotation notation tagged field to the tagged image file format image. The rotation notation tagged field may include at least a portion of the rotation information received from the optical character recognition system. The further processing may include causing display of the enhanced image on a display device, and adjusting the orientation may include rotating the image using the rotation information prior to causing the display.

As another example, a computer-implemented method may include, under control of one or more processors, receiving an image showing an item and address information affixed thereto. This method may generate an electronic text record of the address information based on optical character recognition of at least the portion of the image showing the address information and detect orientation information for the image based on a location where the address information is affixed to the item. The method may include determining additional processing of the image is needed to identify routing information for the item based at least in part on the electronic text record and generating an enhanced image, wherein the enhanced image includes the orientation information. The method may also include adjusting an orientation of the enhanced image based on the orientation information prior to the additional processing.

The features may be embodied in an item processing system. For example, the item processing system may include a scanning device configured to acquire an image of an item at a first processing device (e.g., a conveyor). The system may include an unattended image processing server. The unattended image processing server may be configured to generate an electronic text record of address information shown in the image based on optical character recognition of at least the portion of the image and generate an enhanced image including orientation information detected during optical character recognition. The system may include an attended image processing workstation. The workstation may be configured to receive the enhanced image and identify a display orientation for the enhanced image such as based on a stored user preference or the type of item shown in the enhanced image (e.g., letter, parcel, luggage, etc.). The workstation may adjust the enhanced image based on a difference between the display orientation and the rotation information to display the enhanced image as adjusted on a display device. The workstation may then receive an address information input for the enhanced image such as a ZIP code shown in the image. This address information may be transmitted to the unattended image processing server. The address information may be transmitted in a message along with an identifier for the enhanced image and/or item shown therein. The unattended image processing server may be configured to transmit a processing equipment control message to a second processing device to route the item to a location associated with the address information. For example, the processing equipment control message may adjust a sorting device or conveyor belt to direct the item along a path toward the location.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some implementations, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A computer-implemented method comprising:
under control of one or more processors,
receiving an image of an item from item processing equipment, the item processing equipment comprising one or more mechanical devices configured to physically move the item in a distribution network;
receiving a first optical character recognition (OCR) result for the received image, the first OCR result comprising text identified in the image, the first OCR result further comprising a confidence value indicating a degree of certainty of the text identified in the image;
determining that the first OCR result is sufficient to make a further processing decision based at least in part on the confidence value;
generating a second processing equipment control message based at least in part on the first OCR result; and
transmitting the second processing equipment control message to the one or more mechanical devices of the item processing equipment, wherein the second processing equipment control message comprises one or more configuration parameters configured to adjust the one or more mechanical devices such that at least one of the one or more mechanical devices is adjusted to route the item to an intended location in the distribution network based on the identified text obtained by the first OCR result.

2. The computer-implemented method of claim 1, wherein the second processing equipment control message identifies a force, direction for the force, time to apply the force, or other dynamically adjusted parameters of the item processing equipment.

3. The computer-implemented method of claim 1, wherein further comprising:
specifying a threshold of the confidence value indicating a level of confidence required to trust the first OCR result; and
determining that the first OCR result is sufficient to make the further processing decision in response to the confidence value being greater than the threshold.

4. The computer-implemented method of claim 1, wherein the first OCR result comprises additional characteristics of the image.

5. The computer-implemented method of claim 4, wherein the additional characteristics of the image comprise one or more of a size of the image, rotation information of the image, skew information of the image, image color quality, or image resolution.

6. A non-transitory computer readable recording medium storing instructions that, when executed by one or more processors, cause the one or more processors to perform the computer-implemented method of claim 1.

7. The computer-implemented method of claim 1, wherein the identified text comprises at least one of a class of service, an address, or a delivery end point.

8. The computer-implemented method of claim 1, wherein the one or more mechanical devices comprise a sorting device, a conveyor belt, a pinch belt assembly, and a singulation and shingulation assembly.

9. The computer-implemented method of claim 1, wherein at least one of the one or more mechanical devices is configured to be driven by one or more motors.

10. A computer-implemented system comprising:
a memory storing instructions; and
one or more image processing servers configured to execute the instructions to:
receive an image of an item from item processing equipment, the item processing equipment comprising one or more mechanical devices configured to physically move the item in a distribution network;
receive a first optical character recognition (OCR) result for the received image, the first OCR result comprising text identified in the image, the first OCR result further comprising a confidence value indicating a degree of certainty of the text identified in the image;
determine that the first OCR result is sufficient to make a further processing decision based at least in part on the confidence value;
generate a second processing equipment control message based at least in part on the first OCR result; and
transmit the second processing equipment control message to the one or more mechanical devices of the item processing equipment, wherein the second processing equipment control message comprises one or more configuration parameters configured to adjust the one or more mechanical devices such that at least one of the one or more mechanical devices is adjusted to route the item to an intended location in the distribution network based on the identified text obtained by the first OCR result.

11. The computer-implemented system of claim 10, wherein the second processing equipment control message identifies a force, direction for the force, time to apply the force, or other dynamically adjusted parameter of the item processing equipment.

12. The computer-implemented system of claim 10, wherein at least one of the one or more image processing servers is further configured to:
specify a threshold of the confidence value indicating a level of confidence required to trust the first OCR result; and
determine that the first OCR result is sufficient to make the further processing decision in response to the confidence value being greater than the threshold.

13. The computer-implemented system of claim 10, wherein at least one of the one or more image processing servers is further configured to execute the instructions to:
in response to determining that the first OCR result is insufficient to make the further processing decision, generate an embedded image including at least a portion of the first OCR result; and
transmit the embedded image for second OCR processing to an image processing device,
the embedded image configured to cause the image processing device to:
generate a second OCR result based at least in part on the first OCR result in the embedded image;
generate a first processing equipment control message based at least in part on the second OCR result; and
transmit the first processing equipment control message to the item processing equipment,
wherein at least one of the one or more image processing servers is further configured to:
determine that the first OCR result is insufficient to make the further processing decision in response to the text included in the first OCR result lacking a predetermined element associated with delivery of the item.

14. The computer-implemented system of claim 10, wherein at least one of the one or more image processing servers is further configured to execute the instructions to:

in response to determining that the first OCR result is insufficient to make the further processing decision, generate an embedded image including at least a portion of the first OCR result; and transmit the embedded image for second OCR processing to an image processing device, the embedded image configured to cause the image processing device to:
  generate a second OCR result based at least in part on the first OCR result in the embedded image;
  generate a first processing equipment control message based at least in part on the second OCR result; and
  transmit the first processing equipment control message to the item processing equipment, wherein the second OCR result comprises a user input identifying at least a portion of address information for the item.

* * * * *